(12) United States Patent
Hartman

(10) Patent No.: US 6,183,673 B1
(45) Date of Patent: Feb. 6, 2001

(54) METHOD FOR FORMING EXTRUDED FOAM WITH SURFACE COATING

(75) Inventor: Steven Hartman, Erin (CA)

(73) Assignee: Industrial Thermo Ploymers Limited, Brampton ( * ) Notice: Under 35 U.S.C. 154(b), the term of this patent shall be extended for 0 days.

(21) Appl. No.: 09/065,527

(22) Filed: Apr. 24, 1998

(51) Int. Cl.[7] .................................................. B29C 44/24
(52) U.S. Cl. ........................ 264/45.9; 264/45.8; 264/48
(58) Field of Search .......................... 264/45.9, 48, 45.8; 425/4 C

(56) References Cited

U.S. PATENT DOCUMENTS

| | | | | |
|---|---|---|---|---|
| 4,206,165 | * | 6/1980 | Dukess | 264/45.9 |
| 4,221,624 | * | 9/1980 | Eslinger et al. | 264/45.9 |
| 4,322,260 | * | 3/1982 | Conlon | 264/45.9 |
| 4,364,882 | * | 12/1982 | Doucet | 264/45.9 |
| 4,469,651 | * | 9/1984 | Hahn et al. | 264/53 |
| 4,889,669 | * | 12/1989 | Suzuki | 264/45.9 |
| 5,190,706 | * | 3/1993 | Knaus | 264/45.9 |
| 5,686,128 | * | 11/1997 | Tracy et al. | 264/45.9 |
| 5,759,461 | * | 6/1998 | Jarvenkyla et al. | 264/45.9 |

FOREIGN PATENT DOCUMENTS

| | | | | |
|---|---|---|---|---|
| 28 21 333 | * | 11/1978 | (DE) | 264/45.9 |
| 0 043 543 | * | 1/1982 | (EP) | 264/45.9 |
| 47-47105 | * | 11/1972 | (JP) | 264/45.9 |
| 57-91240 | * | 6/1982 | (JP) | 264/45.9 |
| 4-325223 | * | 11/1992 | (JP) | 264/45.9 |

* cited by examiner

Primary Examiner—Allan R. Kuhns

(57) ABSTRACT

An extruded foam product is manufactured with an integral thin coating of a different material on the surface thereof. The coating is applied to the product as part of the extrusion process and prior to foaming and expansion of the product using a co-extrusion die. The coating can have vastly different or specialized properties while having an inexpensive body portion. This co-extrusion arrangement simplifies the manufacturing of the product, and allows a very thin coating to be produced, if desired.

11 Claims, 3 Drawing Sheets

METHOD FOR FORMING EXTRUDED FOAM WITH SURFACE COATING

BACKGROUND OF THE INVENTION

The present invention relates to an apparatus and a process for the manufacture of a two-part foam product having a cellular body portion of one material and a thin integral ski n coating applied and fused to the outer surface of the body portion.

Extruded polyethylene foam products are commonly available and in many cases have a circular cross section. It is possible to manufacture other cross sections, however, these are more difficult, particularly when the size of the extruded product is large. Foam products produced by extrusion have an extrusion skin which is formed during cooling of the product and is of the same material as the body portion.

The density of extruded foam products is easily controlled and the nature of the product normally requires a certain density for the particular application or desired durability. For example, if the foam product is being used as a bumper for boats, the density would be relatively high.

There are some applications for extruded foam products where it would be desirable to provide a skin coating on the surface of the extruded product to impart to the exterior of the product, characteristics different from the material characteristics of the foam body. In some cases, it is desirable to impart a protective coating to form a sheath about the extruded foam product. Extruded sheath foam products are used as a protective wrap about structural members such as playground equipment, exercise equipment or structural members such as basketball poles or protective pads about exercise equipment. In such cases it is desirable to alter the surface characteristics of the extruded foam product by the application of an integral skin of a different material to provide different properties to the product or to make the product suitable for a particular application.

SUMMARY OF THE INVENTION

An apparatus for manufacture of a two-part extruded foam product according to the present invention comprises a co-extrusion apparatus having a main extruder and a secondary extruder. The main extruder extrudes the foam body portion of the product through a main die outlet for foaming to final shape after discharge from the main die outlet. The second extruder extrudes a coating on said body portion through a ring outlet as said body portion moves towards the main die outlet and coats the body portion prior to discharge through the main die outlet. This coating expands with the foam body portion after leaving the main die outlet.

According to an aspect of the invention the ring outlet includes a large reservoir about the ring outlet for feeding of the material to be extruded through the ring outlet.

According to yet a further aspect of the invention the co-extruder has a composite die for defining the main die outlet and the ring outlet. The composite die includes an adjustable part defining the size of the ring outlet and this adjustable part is movable, relative to the main die part for controlled adjustment of the ring outlet.

According to yet a further aspect of the invention, the adjustable part of the composite die is adjusted by a rotational movement of the adjustable part relative to the main die part.

According to yet a further aspect of the invention, the ring outlet is provided in an inwardly tapering wall leading to the main die outlet.

According to yet a further aspect of the invention, the inwardly tapering wall defines a conical passageway with the main die outlet located at the apex of the conical passageway.

A process for the manufacture of an extruded product having a foam body portion of a first material coated with an integral surface skin of a second material bonded to the foam body portion comprises preparing a mixture of the material of said body portion and a foaming agent, providing said mixture to a first extruder and extruding said mixture through a main die outlet causing foaming of the body portion and expansion of the cross-section of the body portion generally after extrusion through said main die outlet; preparing a second material in a second extruder, and forcing said second material through a ring outlet onto the first material immediately adjacent to the main die outlet, and in said first extruder, to form an integral surface coating on the first material prior to extrusion through the main die outlet.

According to yet a further aspect of the invention, the process includes adjusting the size of the ring outlet to achieve the continuous skin about the exterior of the foamed body portion.

According to yet a further aspect of the invention the process includes a mixture of the first material and a foaming agent which produces a dense foam body portion.

According to yet a further aspect of the invention the process includes using a second material having a melt index of at least 50% greater than the melt index of the first material.

According to yet a further aspect of the invention the process includes controlling the size of the extrusion product by controlling the first extruder and the mixture of the first extruder. With this process, the final size of the composite product can be accurately controlled.

According to yet a further aspect of the invention the process includes selecting the first material and the second material to have radically different characteristics with the second material selected to provide good air sealing characteristics.

According to yet a further aspect of the invention, the process includes controlling the size of the ring outlet to achieve in the extruded product a skin thickness of the second material of less than two thousandths of an inch.

According to yet a further aspect of the invention the process includes controlling the size of the ring outlet to produce an extruded product having a skin of the second material with a thickness of less than one thousandths of an inch.

According to yet a further aspect of the invention the process produces an initial thickness of a second material in the die of a first thickness which reduces in thickness by at least 50% as the body portion expands after extrusion through the main die outlet. With this arrangement, thinning of the skin is accomplished due to expansion of the body portion. This allows very thin skins to be produced on the final product and is advantageous in that less material may be used while still imparting the desirable characteristics to the surface of the product.

The present invention also is directed to this two-part foam product having a body portion of a first material and a thin skin coating of a second material where the skin coating is less than two thousandths of an inch.

The present invention is also directed to extruded foam products having a two-part composition of a body portion of one material and a skin of a different material where the tolerance variation with respect to the diameter of the product is maintained within 2%.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
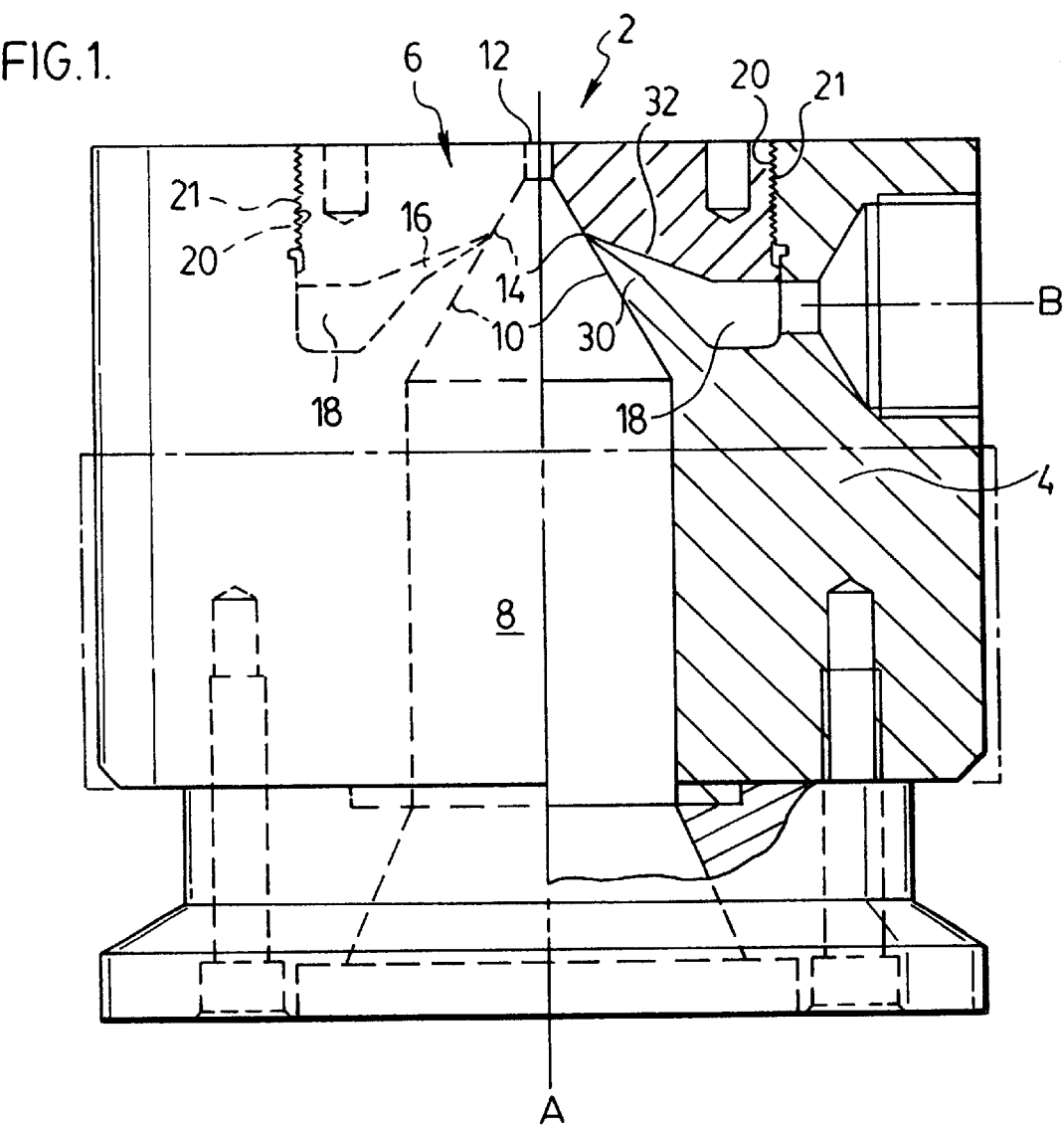
FIG. 1 is a partial cutaway of the composite die showing the relationship of the main die outlet and the ring outlet and the location of the extruders.
Figure 2:
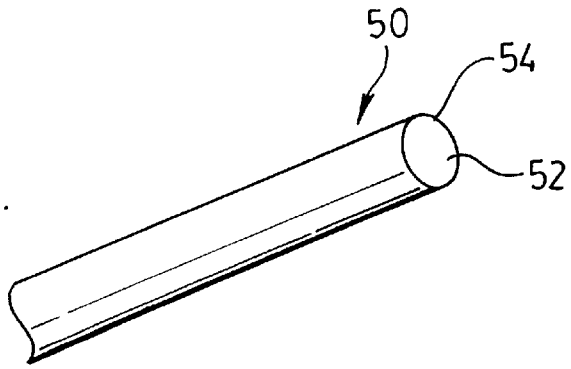
FIG. 2 is a partial perspective view illustrating the product produced using the present apparatus and the process.

FIG. 1 shows the die 2 for co-extrusion of the foamed product 50, shown in FIG. 2. The product has a foamed body portion 52 with an integral skin coating 54 provided on the surface of the extruded product. This product is manufactured using a single extrusion step using the die 2. The die has a main die portion 4 which cooperates with a secondary die portion 6.

The die 2 has a main extruding passageway 8 leading from the main extruder generally indicated as "A". The main extruding passageway 8 cooperates with the converging conical end portion 10 for reducing the passageway to the main die outlet 12. Intermediate the main passageway 8 and the die outlet 12, is the ring outlet 14. It is positioned in the conical end portion defined by 10. The ring outlet applies the skin 54 to the surface of the body portion 52 of the product prior to the product passing through the main die outlet 12.

Associated with the ring outlet 14 is a converging feed channel 16 which encircles the outlet. A circular reservoir 18 feeds the converging feed channel 16. The reservoir 18 is associated with the secondary extruder "B" and provides the second material to the ring outlet 14.

The secondary die portion 6 has threads 20 which cooperate with threads 21 of the main die portion 4 to allow adjustment of the secondary die portion relative to the main die portion. This thread adjustment varies the size of the ring outlet 14 and allows for adjustment and control of the thickness of the skin coating 54.

Figure 3:
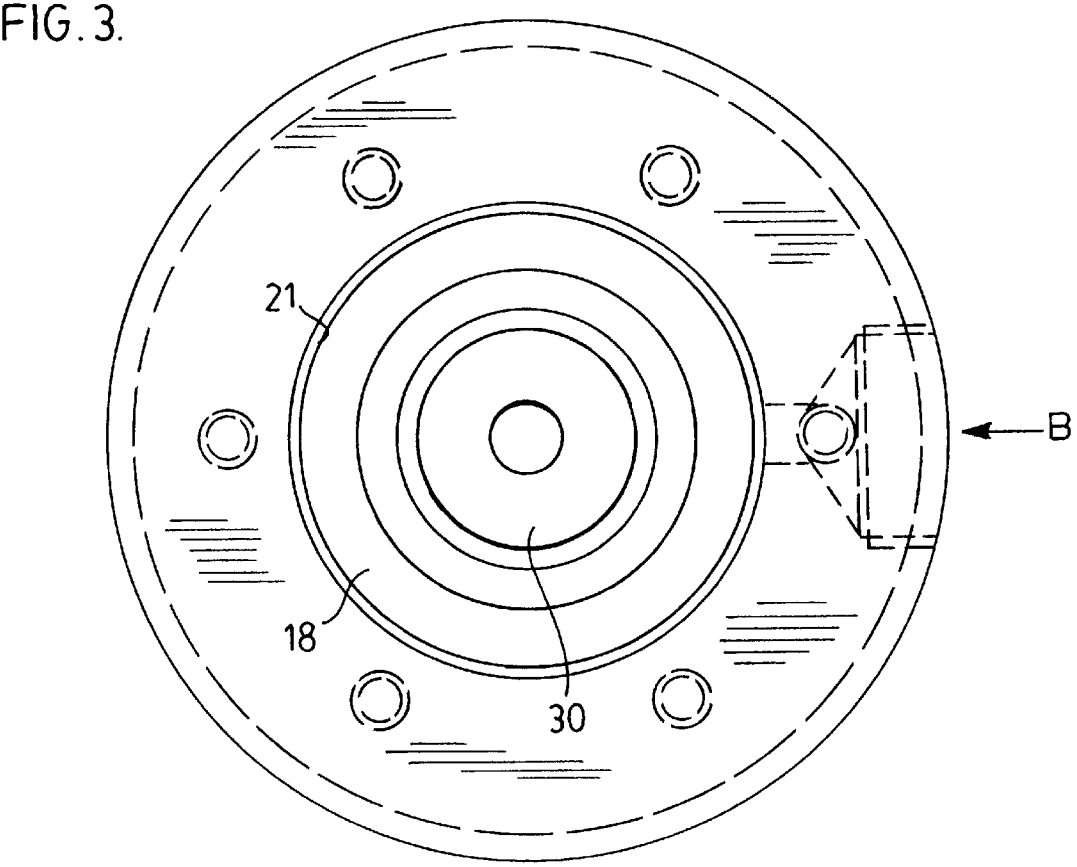
FIG. 3 is a top view of the main die part.
Figure 4:
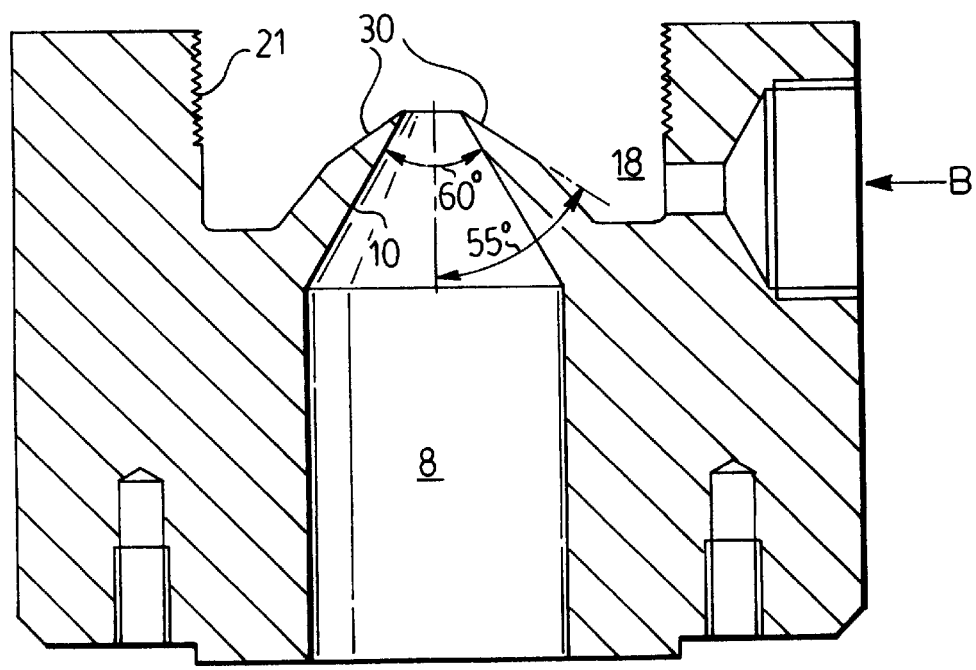
FIG. 4 is a sectional view through the main die part.

Details of the main die portion 4 are shown in FIGS. 3 and 4. The secondary extruder "B" provides material to the ring outlet reservoir 18 which distributes this material to the ring outlet. With this arrangement, variations in pressure about the ring outlet are reduced and thus the skin thickness is more consistent.

Figure 5:
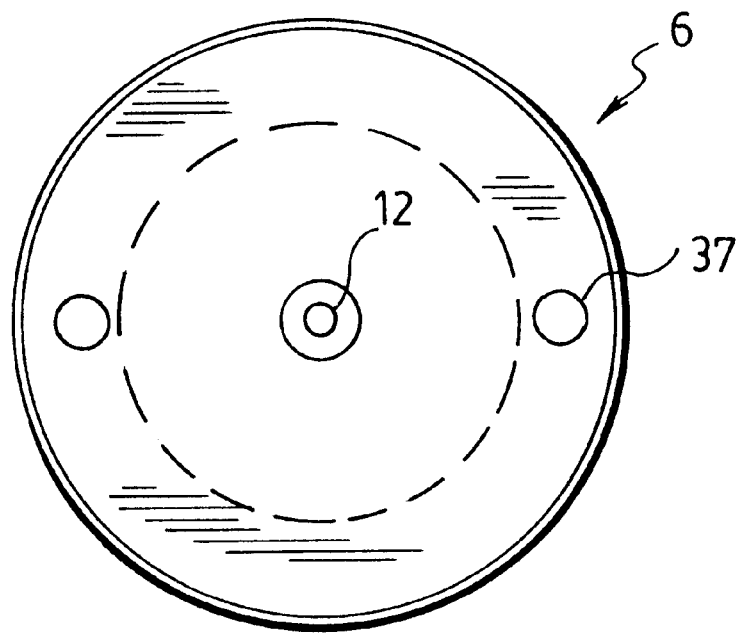
FIG. 5 is a top view of the adjustable part of the composite die.
Figure 6:
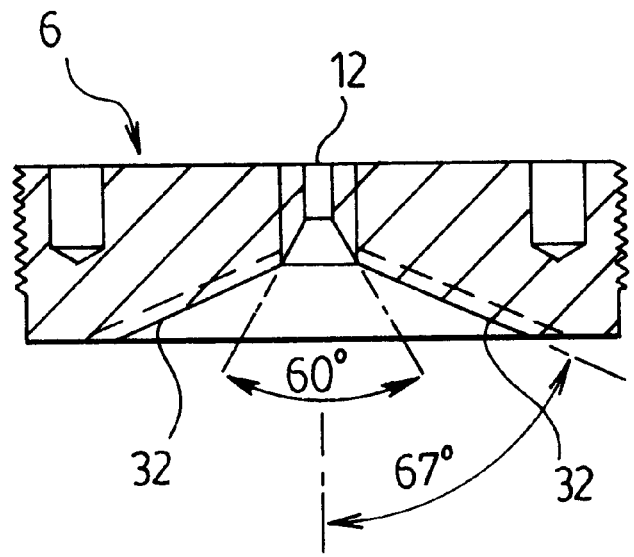
FIG. 6 is a sectional view through the adjustable part of the composite die.

Details of the secondary die portion 6 are shown in FIGS. 5 and 6.

The thread adjustment of the secondary die portion 6 relative to the main die portion 4 for adjusting the size of the ring outlet 14 is simple and effective. Other arrangements are also possible for adjusting the ring outlet size.

As shown in FIG. 4, the conical surface 30 of the main die portion 4 forms part of the converging feed channel 16 to the ring outlet 14. This conical surface is at an angle of 55 degrees relative to the longitudinal axis of the main die outlet as shown in FIG. 4. Conical surface 32 of the secondary die portion 6 cooperates with surface 30 to define the ring outlet 14. Surface 32 is disposed at an angle of 67 degrees relative to the longitudinal axis of the main die outlet 12. This forms the other boundary of the converging feed channel 16 to the ring outlet 14.

By thread adjustment of the secondary die portion 6, the size of the ring outlet is increased or decreased. This provides a simple mechanism that allows the operator to adjust the die and achieve a desired skin coating thickness.

When the product exits from the main die outlet 12, it expands greatly due to the foaming agent that has been mixed with the first material in the main extruder "A". The expansion of the product is at least two to three times, and often, many times greater. This expansion effectively thins the integral surface coating which is still at an elevated temperature. The surface coating thins in a generally uniform manner and the coating provides a continuous sheath about and secured to the body portion 52.

There are a number of enhanced thermoplastic materials which have characteristics which are selected to meet particular application requirements. These surface coating materials can be expensive and it is desirable to control the amount of material in the final product. With the present arrangement, it is possible to use an inexpensive body portion and provide a specialized coating on the exterior of the product in a cost effective manner. It is also possible to more accurately control the tolerance variations in the diameter of the final product or the outer configuration of the product. Many extruded foam products are of circular cross-section as this is the tendency of the product due to the expansion of the foaming agent. The two part product also allows the body material to be selected for certain physical characteristics and the skin coating to be selected for different characteristics.

This technology can apply a thin skin coating to a body portion of a somewhat dense polyethylene or polyolefin foam. A skin of a specialized material having characteristics significantly different from the body portion is applied about the body portion. The specialized material can be selected for the particular application and preferrably has a relatively low viscosity. The low viscosity allows it to flow easily and form the skin coating. The material can be selected to have, for example, good sealing characteristics for a particular application, or to add puncture resistance to the product, or to add toughness or stiffness to the product. It is also possible for the coating to provide enhanced UV stability, fire retardance or intense colour. Other applications include printable surface, friction characteristics and adhesion characteristics. These examples are not limiting and other characteristics can be achieved for a particular application.

The body portion can be a polyethylene enhanced material to provide good resiliency and a fairly firm body portion with respect to compression. It is a relatively dense body portion and the size of the cells is small and consistent.

With this arrangement the main extruder "A" operates with the enhanced polyethylene material and can extrude product at a rate of about 50 pounds per hour. The enhanced polyethylene material has a melting point in the range of 95° C. to 98° C. In contrast the surface material of extruder "B" can have a much higher melting point. As the material exits the ring orifice 14, it is at a temperature of higher than the cooler body portion. Almost immediately after the coating is applied to the body portion, the product exits the main die outlet and undergoes an expansion of at least two times the cross sectional area. The resulting skin coating, although it is being applied to a cooler body, still thins and maintains a coating about the body portion. The extruded product is still quite hot and can be cooled in the conventional manner.

The secondary extruder "B" is applying material in the order of four to five pounds per hour. The thickness of the coating is controlled by adjusting the secondary die provide a desired skin thickness. Control on the diameter of the final product is more precise using this co-extrusion technique. The tolerance on the diameter of the product can easily be maintained within two percent and the thickness of the coating material can be accurately controlled. The coatings can have a thickness of less than two thousandths of an inch and in some cases, are one thousandths of an inch, or less.

Specialized polymer coating materials allow desired surface characteristics for coating to be applied to a foamed body portion. The characteristics are chosen to meet a particular application of a product. For example, ethylene vinyl acetate (EVA) has desirable characteristics for certain applications and it can be used as a coating material.

It has been found in the present application that even though the foam body portion undergoes great cross sectional expansion after exiting the main die outlet, the skin which is applied to the body portion prior to exiting the die also expands and maintains the full coverage about the extruded body portion.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A process for manufacturing an extruded product having a foam body portion of a first material coated with an integral surface skin of a second material fused to said foam body portion, comprising the steps of
preparing a mixture of the material of said body portion and a foaming agent, providing said mixture to a first extruder and extruding said mixture through a main die outlet causing foaming of the body portion and a great expansion of the cross section of the body portion, generally after extrusion through said main die outlet,
preparing in a second extruder, said second material for extrusion and forcing said second material through a ring outlet onto said first material, immediately adjacent to said main die outlet and forming an integral surface coating to said first material, prior to extrusion through said main die outlet and including adjusting the size of said ring outlet during extrusion of the product to achieve a continuous integral skin to the exterior of said foam body portion.

2. A process as claimed in claim 1 wherein said mixture in said first extruder produces a dense cellular body portion.

3. A process as claimed in claim 2 wherein said second material has a melt index at least 50% greater than the melt index of said first material.

4. A process as claimed in claim 1 including controlling the size of the extruded product by controlling said first extruder and the mixture of said first extruder.

5. A process as claimed in claim 4 wherein said first material is a polyethylene material.

6. A process as claimed in claim 5 wherein said polyethylene material includes additives for improved resiliency toughness, stiffness and/or strength.

7. A process as claimed in claim 1 wherein said process extrudes a generally circular in cross section foam product with the integral surface skin thereabout.

8. A process as claimed in claim 1 wherein adjustment of the size of the ring outlet is accomplished by a screw adjustment of the main die outlet.

9. A process for manufacturing an extruded product having a foam body portion of a first material coated with an integral surface skin of a second material fused to said foam body portion, comprising the steps of
preparing a mixture of the material of said body portion and a foaming agent, providing said mixture to a first extruder and extruding said mixture through a main die outlet causing forming of the body portion and a great expansion of the cross section of the body portion, generally after extrusion through said main die outlet,
preparing in a second extruder, said second material for extrusion and forcing said second material through a ring outlet onto said first material, immediately adjacent to said main die outlet and formic an integral surface coating to said first material, prior to extrusion through said main die outlet and including adjusting the size of said ring outlet during the extrusion of the product to achieve a continuous integral skin to the exterior of said foam body portion, and
including controlling the size of said ring outlet to achieve in the extruded product a skin thickness of said second material of less than 2 thousandths of an inch.

10. A process for manufacturing an extruded product having a foam body portion of a first material coated with an integral surface skin of a second material fused to said foam body portion, comprising the steps of
preparing a mixture of the material of said body portion and a foaming agent, providing said mixture to a first extruder and extruding said mixture through a main die outlet causing foaming of the body portion and a great expansion of the cross section of the body portion, generally after extrusion through said main die outlet,
preparing in a second extruder, said second material for extrusion and for said second material through a ring outlet onto said first material, immediately adjacent to sid main die outlet and forming an integral surface coating to said first material, prior to extrusion through said main die outlet and including adjusting the size of said ring outlet during the extrusion of the product to achieve a continuous integral skin to the exterior of aid foam body portion, and
including controlling the size of said ring outlet to achieve in the extruded product a skin thickness of said second material of less than 1 thousandths of an inch.

11. A process as claimed in claim 10 wherein said skin thickness reduces in thickness by at least 50% as said body portion expands after extrusion through said main die outlet.

* * * * *